US012634391B1

(12) United States Patent (10) Patent No.: US 12,634,391 B1
Kumar Agrawal et al. (45) Date of Patent: May 19, 2026

(54) DISCREET DEVICE ACCESS INDICATION USING GENERATIVE AI

(71) Applicant: MOTOROLA MOBILITY LLC, Wilmington, DE (US)

(72) Inventors: Amit Kumar Agrawal, Bangalore (IN); Panduranga Reddy Pailla, Nalgonda (IN); Shuaib Puzhakkal Kavalathara, Tirur (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 19/034,908

(22) Filed: Jan. 23, 2025

(51) Int. Cl.
| | |
|---|---|
| *H04M 1/72427* | (2021.01) |
| *G06F 3/0481* | (2022.01) |
| *G06F 9/451* | (2018.01) |
| *G06T 7/90* | (2017.01) |
| *G06V 40/16* | (2022.01) |

(52) U.S. Cl.
CPC ...... *H04M 1/72427* (2021.01); *G06F 3/0481* (2013.01); *G06F 9/451* (2018.02); *G06T 7/90* (2017.01); *G06V 40/172* (2022.01)

(58) Field of Classification Search
CPC .. G06F 3/0481; G06F 9/451; H04M 1/72427; G06T 7/90; G06V 40/172

USPC .......................................................... 345/156
See application file for complete search history.

(56) References Cited

U.S. PATENT DOCUMENTS

| | | | | |
|---|---|---|---|---|
| 7,751,285 | B1 * | 7/2010 | Cain | G04G 9/0017 368/10 |
| 2009/0327927 | A1 * | 12/2009 | De Leon | H04M 1/72448 715/763 |
| 2014/0123273 | A1 * | 5/2014 | Matus | H04M 1/66 726/16 |
| 2015/0362951 | A1 * | 12/2015 | Hicks | A44C 5/0015 345/156 |
| 2025/0095313 | A1 * | 3/2025 | Azmandian | G06F 16/583 |

* cited by examiner

*Primary Examiner* — Mark Edwards
(74) *Attorney, Agent, or Firm* — Isidore PLLC

(57) ABSTRACT

A method provides techniques for discreet device access indication using generative artificial intelligence. An attempt to access an electronic device is detected by at least one processor of the electronic device, which includes an electronic display and at least one image capturing device. An image of a person attempting the access is captured via the at least one image capturing device. A customized display theme is generated based on the captured image. The customized display theme is then rendered and presented on a display of the electronic device to serve as a discreet device access indication.

18 Claims, 11 Drawing Sheets

500

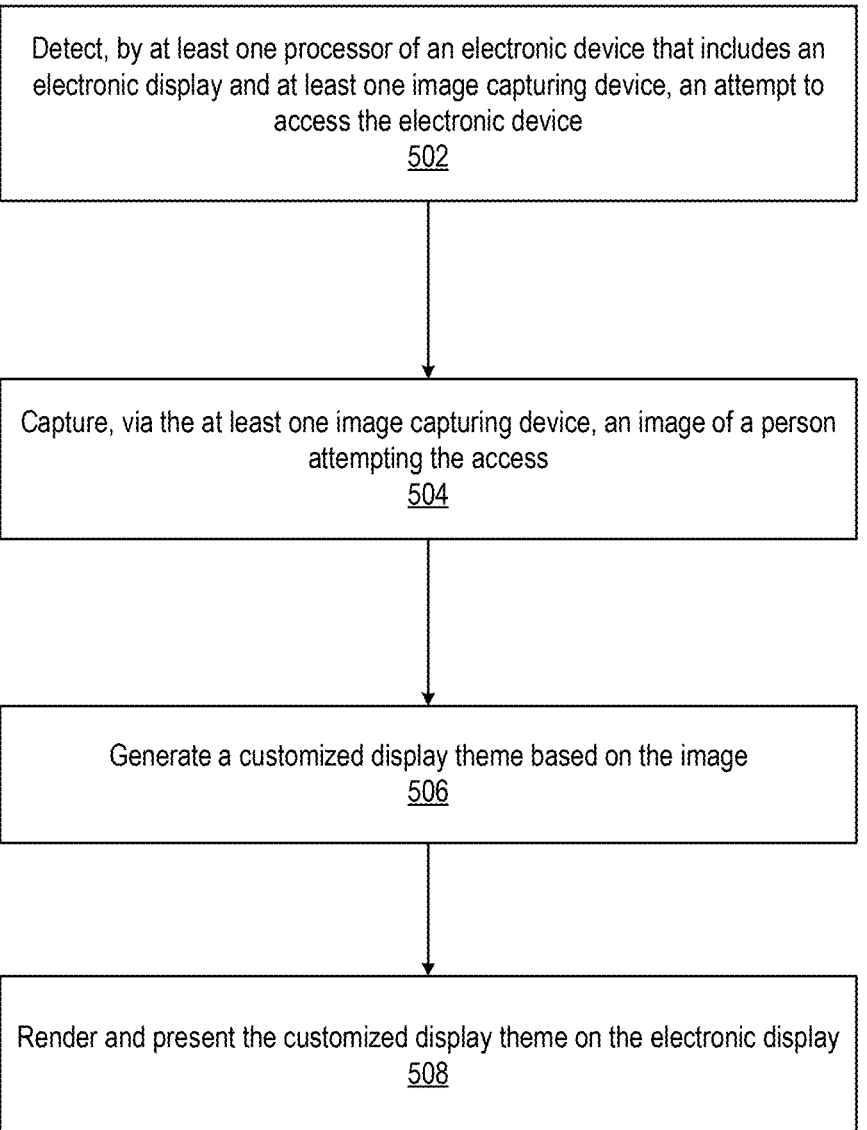

Detect, by at least one processor of an electronic device that includes an electronic display and at least one image capturing device, an attempt to access the electronic device
502

Capture, via the at least one image capturing device, an image of a person attempting the access
504

Generate a customized display theme based on the image
506

Render and present the customized display theme on the electronic display
508

*FIG. 5*

DISCREET DEVICE ACCESS INDICATION USING GENERATIVE AI

BACKGROUND

1. Technical Field

The present disclosure generally relates to electronic devices, and more specifically to electronic devices that support controlled access.

2. Description of the Related Art

Smartphones and tablets often store personal and sensitive data such as emails, photos, financial information, and access credentials. Locking these devices helps prevent unauthorized access to this data. A lock screen presents options for a person to gain access to the device by correctly entering a security code or image. With the lock screen activated, the device can monitor access attempts and suspend the access mechanism following multiple failed attempts in a short time frame, which can be indicative of an attempted unauthorized use. Properly locking devices and monitoring access attempts are foundational aspects of electronic device security, safeguarding both personal and organizational data while promoting accountability and vigilance against threats.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 5 depicts a flowchart of a computer-implemented method for discreet device access indication using generative artificial intelligence (AI), according to one or more embodiments.

DETAILED DESCRIPTION

Figure 1A:
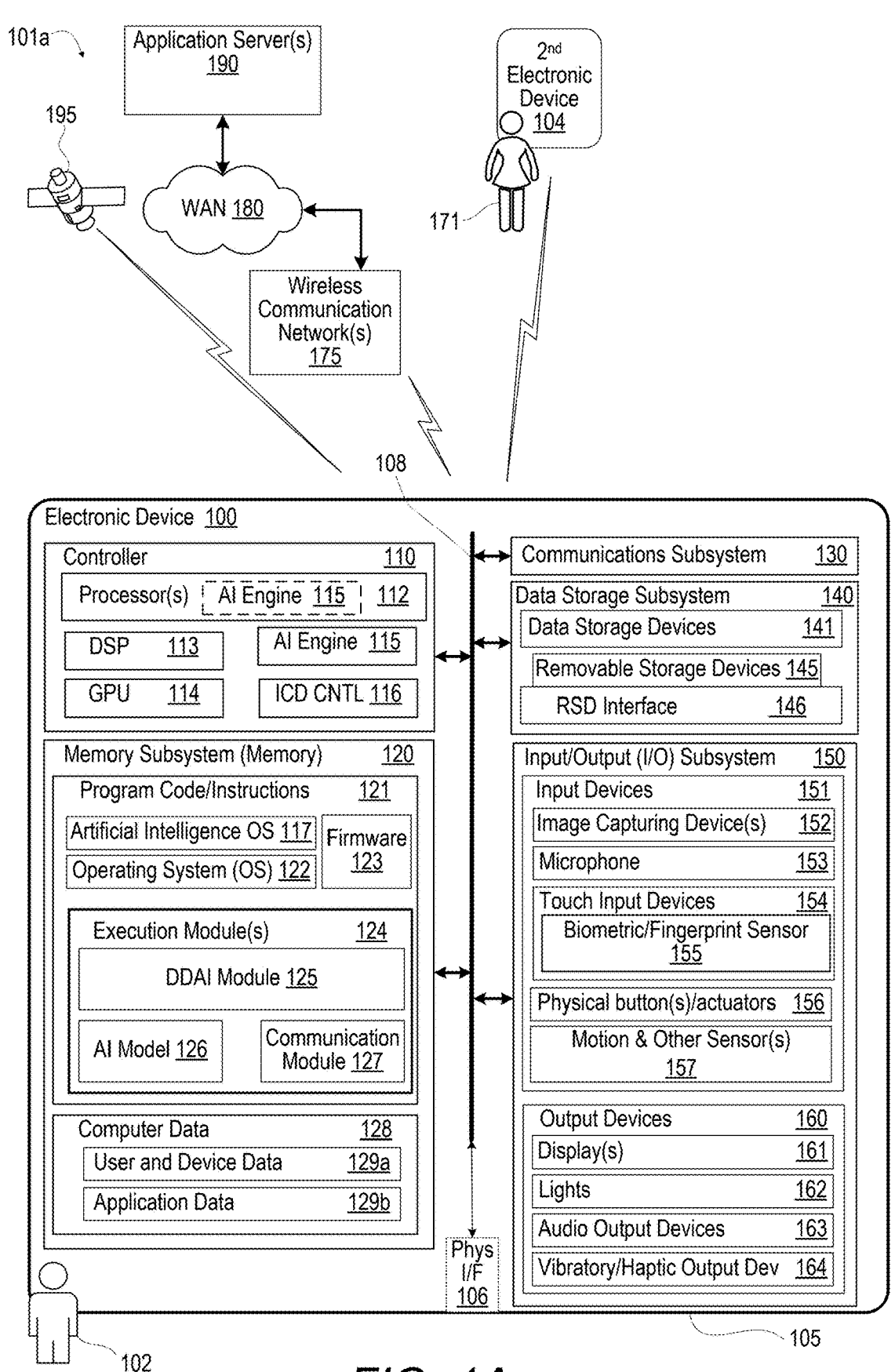
FIG. 1A presents a functional block diagram of example components of an electronic device in a communication environment and having hardware and software components that enable the features of the present disclosure to be advantageously implemented, according to one or more embodiments.

According to aspects of the present disclosure, an electronic device, a method, and a computer program product provide techniques for discreetly indicating attempted and/or successful device access by someone other than a primary device user. Electronic devices such as smartphones, tablet computers, wearable computers, and the like, can contain important personal and/or financial information. In some cases, a user may leave his/her electronic unattended in locations with other people, e.g., at home with family members or friends present, at his office with co-workers, at a gathering such as a party, etc. Another person may attempt to unlock/access the electronic device. Even if the unlock/access attempt is unsuccessful, it can be advantageous for the user to know that unauthorized/unexpected access has been attempted/completed on his/her device. Moreover, it can be helpful for a user to know who attempted access to the device, especially if the person who attempted access was a close friend or family member. However, in the case of a close friend or family member, showing direct evidence of the attempted access can lead to awkwardness and/or embarrassment.

The disclosed embodiments address the aforementioned issues by using generative artificial intelligence (Gen-AI) to create a discreet visual clue as to who has attempted/completed access to an electronic device. One or more embodiments identify a person who is attempting access of the electronic device by using one or more onboard image capture devices (cameras) of the electronic device to acquire images of the person. In one or more embodiments, apparel being worn by the person is identified, and a pattern and/or color scheme of the apparel is identified. A Gen-AI process is used to create a screen pattern based on the apparel and the created pattern is used as a design element on the display of the electronic device. In one or more embodiments, the design element can include a background (wallpaper), border, and/or other suitable design element. One or more embodiments can perform a facial recognition process on the person attempting to unlock the electronic device and access a profile based on the facial recognition process. The profile can contain metadata such as interests, school history, employment history, and so on. In one or more embodiments, the Gen-AI process can create a pattern based on one or more pieces of metadata and apply that pattern to the display of the electronic device. In this way, disclosed embodiments provide a subtle clue as to who attempted to access (or accessed) the electronic device. In an exemplary use case, a person tries to unlock the device while wearing a plaid shirt. The device's cameras capture the image of the plaid shirt during the access attempt, and the Gen-AI process generates a wallpaper with a plaid-inspired pattern. The authorized user of the electronic device, upon seeing the change in the background of the display of the electronic device, realizes someone having visual characteristics that includes a plaid pattern has tried to access the device and can investigate further.

According to one aspect, an attempted access of an electronic device is detected. Contextual data from the person that interacted with an electronic device is used as input to a generative AI process to create a pattern. The interaction with the electronic device can include attempted device access (attempted device unlocking), successful device access (successful device unlocking), and/or use of the electronic device while it is unlocked. The contextual data can include data retrieved from a profile, contact database, or other source. The contextual data can include biographical information, interests, hobbies, activities, and the like for the person who is interacting with the device and that has been stored on the device or is accessible from an external storage to which the device is communicatively connected. As an example, the contextual data can indicate that a person interacting with the device likes surfing. Accordingly, a resultant pattern created by Gen-AI can include a pattern that resembles ocean waves. In some embodiments, the pattern is used as a design element on a display of the electronic device, thereby providing a subtle clue that indicates an attempted access, and hints at the identity of the person that attempted the access. In this way, an authorized user of the device can tell at a glance that a device access has been attempted and utilize the design element as a clue to narrow down or identify which person may have attempted to access the device. Disclosed embodiments may further provide a user interface to reveal additional details regarding the access attempt.

One or more embodiments can provide an electronic device comprising: an electronic display; at least one image capturing device (ICD) that captures image content; at least one input device that can be utilized for accessing the electronic device; a memory having stored thereon a discreet device access indication (DDAI) module; and at least one processor communicatively coupled to the electronic display, the at least one ICD, the at least one input device, and the memory. The at least one processor executes program code of the DDAI module, and is configured to cause the electronic device to: in response to detecting an attempt to access the electronic device: capture, via the at least one image capturing device, an image of a person attempting the access; generate a customized display theme based on the image; and render and present the customized display theme on the electronic display.

One or more embodiments can provide a method that includes: detecting, by at least one processor of an electronic device that includes an electronic display and at least one image capturing device, an attempt to access the electronic device; capturing, via the at least one image capturing device, an image of a person attempting the access; generating a customized display theme based on the image; and rendering and presenting the customized display theme on the electronic display.

Further embodiments can provide a computer program product including: a non-transitory computer readable medium; and program code on the computer readable medium that when processed by a processor of an electronic device configures the processor to perform functions of the above-described method.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the communication/electronic devices are also described as features and functions provided by a plurality of corresponding methods and computer program products, within the various different embodiments presented herein. In the embodiments presented as computer program products, the computer program product includes a non-transitory computer readable storage device having program instructions or code stored thereon, and configuring the electronic device and/or host electronic device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", "some embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1A-1B) are not intended to be exhaustive, but rather arc representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure. Throughout this disclosure, the terms 'electronic device', 'communication device', and 'electronic communication device' may be used interchangeably, and may refer to devices such as smartphones, tablet computers, and/or other computing/communication devices.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1A, there is illustrated a block diagram of an example electronic device 100 in communication environment 101a and having hardware and software components, which enable the features of the present disclosure to be advantageously implemented, according to one or more embodiments.

Examples of electronic device 100 can include, but are not limited to, mobile devices, a notebook computer, a mobile phone, a smart phone, a digital camera with enhanced processing capabilities, a smart watch, a tablet computer, and other types of electronic devices. For purposes of this disclosure, electronic device 100 is assumed to be a communication device that can be used to engage in a voice and/or video call with a second communication device. Electronic device 100 can therefore be interchangeably referred to herein as communication device 100.

Electronic device 100 generally includes controller 110, memory (or memory subsystem) 120, communication subsystem 130, data storage subsystem 140, input/output subsystem 150, all contained within or extended from an exterior surface of device housing 105. Controller 110 is shown communicatively connected/coupled via system interlink 108 with each of the subsystems 120, 130, 140, and 150, and is directly or indirectly connected with the individual components within each subsystem 120, 130, 140, and 150. System interlink 108 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components.

Controller 110 includes processor 112, which includes one or more central processing units (CPUs) or data processors. Processor 112 performs many of the features of controller 110 and references to features performed by controller 110 can be interchangeably referred to herein as features of processor 112, and vice-versa. In some embodiments, the various functions associated with controller 110 are integrated into processor 112, and accordingly, references made herein to controller and/or processor are understood to refer to one or both components as providing a single management component within the electronic device 100. For simplicity in describing the features of the electronic device 100, the operational functions provided by one or more of operational components within controller 110, including those provided by processor 112 are collectively described as being performed by controller 110. Collectively, components integrated within controller 110 support computing, classifying, processing, transmitting and receiving of data and information, and presenting of graphical and photographic images within a display.

As illustrated, controller 110 can also include one or more digital signal processors 113, graphics processing units (GPUs) 114, artificial intelligence (AI) engine 115, and image capturing device (ICD) controller 116. In some embodiments, the functionality of each of these additional processing components can be integrated with processor(s) 112. Processor 112 can further include other processors such as auxiliary processor(s) that may act as a low power consumption, always-on sensor hub for physical sensors.

Controller 110 manages, and in some instances directly controls, the various functions and/or operations of electronic device 100. These functions and/or operations include, but are not limited to including, application data processing, communication, location and navigation tasks, image processing, and signal processing. In one or more alternate embodiments, electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard-wired logic. Controller 110 can, in some embodiments, also include a hardware acceleration (HA) unit, which can establish direct memory access (DMA) sessions to route network traffic to various elements within electronic device 100 without direct involvement from processor 112 and/or a device operating system 122. Operating system 122 may include or be augmented by device AI operating system (OS) 117 that can include native support for AI-specific hardware such as Neural Processing Units (NPUs) or Tensor Processing Units (TPUs) to optimize performance for AI tasks such as machine learning inference and training.

Memory subsystem (or memory) 120 may include a combination of volatile and non-volatile memory, such as random-access memory (RAM) and read-only memory (ROM). Memory subsystem 120 stores instruction or program code 121 for execution by processor 112 to configure processor 112 (and more generally electronic device 100) to provide the operational functions and features described herein. Instructions/program code 121 (or program code 121 for short) includes instructions for an operating system (OS) 122, firmware 123, such as basic input/output system (BIOS) or Uniform Extensible Firmware Interface (UEFI). Program code 121 includes execution module(s) 124 that collectively provides the various features of the disclosure. Execution module(s) 124 include, without limitation, discreet device access indication (DDAI) module 125, which provides the features and operating functionality of the disclosed embodiments when the corresponding program instructions of discreet device access indication (DDAI) module 125 are processed by/within processor 112/controller 110.

Execution modules 124 further includes AI model(s) 126. In one or more embodiments, processor 112 can utilize AI models 126 to provide AI functionality of processor-integrated AI engine 115. In other embodiments, AI models 126 are directly utilized by AI engine 115. In one or more embodiments, AI model(s) 126 is integrated as a sub-module within DDAI module 125 and is trained to support AI features of DDAI module 125. AI model(s) 126 may include an artificial neural network, a decision tree, a support vector machine, Hidden Markov model, linear regression, logistic regression, Bayesian networks, and so forth. AI model(s) 126 can be individually trained to perform specific tasks and can be arranged in different sets of AI models to generate different types of output. Training of AI model(s) 126 is the process by which AI models are trained to perform specific tasks or achieve certain objectives. The training involves providing the model with a large amount of data and allowing the model to learn from patterns and relationships within that data.

Each of the above-introduced module(s) and/or application(s) provides program instructions/code that are processed by processor 112 and which configures processor 112 (and/or controller 110) and/or other operational components of electronic device 100 to cause the electronic device 100 to perform specific operations and functions, as described herein. Descriptive names assigned to these modules add no functionality and are provided solely to assist in identifying the underlying features performed by processing the different modules. For example, DDAI module 125 can include program instructions that cause or configure processor 112 to cause electronic device 100 to create a pattern using Gen-AI based on contextual information relating to a person that attempted access of the electronic device 100, and display the generated pattern on the electronic device 100 as a design element. Other features provided by DDAI module 125 are described in further detail throughout this disclosure.

Program code 121 can further include instructions/code for other applications (not shown) providing different features of/within electronic device 100. In one or more embodiments, program code 121 may be integrated into a distinct chipset or hardware module as firmware that operates separately from other executable program code. Portions of program code 121 may be incorporated into different hardware components that operate in a distributed or collaborative manner.

Memory subsystem 120 also includes computer data 128. During execution of program code 121, processor 112 may access, use, generate, modify, store, or communicate computer data 128, such as user and device data 129a and application data 129b. Computer data 128 may incorporate "data" that originated as raw, real-world "analog" information that consists of basic facts and figures. Computer data 128 includes different forms of data, such as numerical data, images, coding, notes, and financial data, as well as data presenting video, graphics, text, and images. Computer data 128 may originate at electronic device 100 or may be retrieved from a remote device via communications subsystem 130. Electronic device 100 may store, modify, present, or transmit computer data 128.

Communications subsystem 130 includes various components that enable electronic device 100 to communicate with external communication networks and other devices, such as second electronic device 104 and application server(s) 190, etc., via communications subsystem 130. According to one or more embodiments, communication module 127 presented within program code 121 includes instructions supporting the use of communications subsystem 130 to establish communication interfaces enabling communication by electronic device 100 with these external networks and devices.

Data storage subsystem 140 of electronic device 100 includes data storage device(s) 141. Controller 110 is communicatively connected, via system interlink 108, to data storage device(s) 141. Data storage subsystem 140 provides stored versions of program code 121 and computer data 128 on nonvolatile storage that is accessible by controller 110. The program code 121 can be loaded into memory 120 for execution/processing by controller 110. In one or more embodiments, data storage device(s) 141 can include hard disk drives (HDDs), optical disk drives, and/or solid-state drives (SSDs), etc.

Data storage subsystem 140 of electronic device 100 can include removable storage device(s) (RSD(s)) 145, which is received in RSD interface 146. Controller 110 is communicatively connected to RSD 145, via system interlink 108 through RSD interface 146. In one or more embodiments, RSD 145 is a non-transitory computer program product or computer readable storage device that stores program code and associated data, including a copy of DDAI module 125 and AI model(s) 126, which may be executed by a processor associated with a user device, such as electronic device 100. Controller 110 can access data storage device(s) 141 or RSD(s) 145 to provision electronic device 100 with stored program code 121 and computer data 128 that, when executed/processed by processor 112, the program code configures processor 112 and/or more generally electronic device 100, to provide the various functions described herein.

I/O subsystem 150 includes input devices 151 such as, but not limited to, image capturing device(s) (ICDs) 152, microphone 153, and touch input devices 154 (e.g., touch screens, keys, or buttons) for use by a user to interface with electronic device 100. Touch input devices 154 can include a biometric/fingerprint sensor 155 for biometric input. Biometric/fingerprint sensor 155 can be used to read/receive biometric data, such as fingerprints, to identify or authenticate a user. In some embodiments, the biometric sensor 155 can supplement an ICD (camera), which captures images for user detection/identification via facial recognition.

Input devices 151 may include physical buttons/actuators 156 that can be located on a periphery of the device housing 105. Physical buttons/actuators 156 may provide controls for volume, power, and ICDs 152. Microphone 153 can also be referred to as an audio input device. In some embodiments, microphone 153 may be used for identifying a user via voiceprint, voice recognition, and/or other suitable techniques. Input devices 151 can also include one or more motion or other sensor(s) 157, which are further defined in the FIG. 1B description which follows.

Figure 1B:
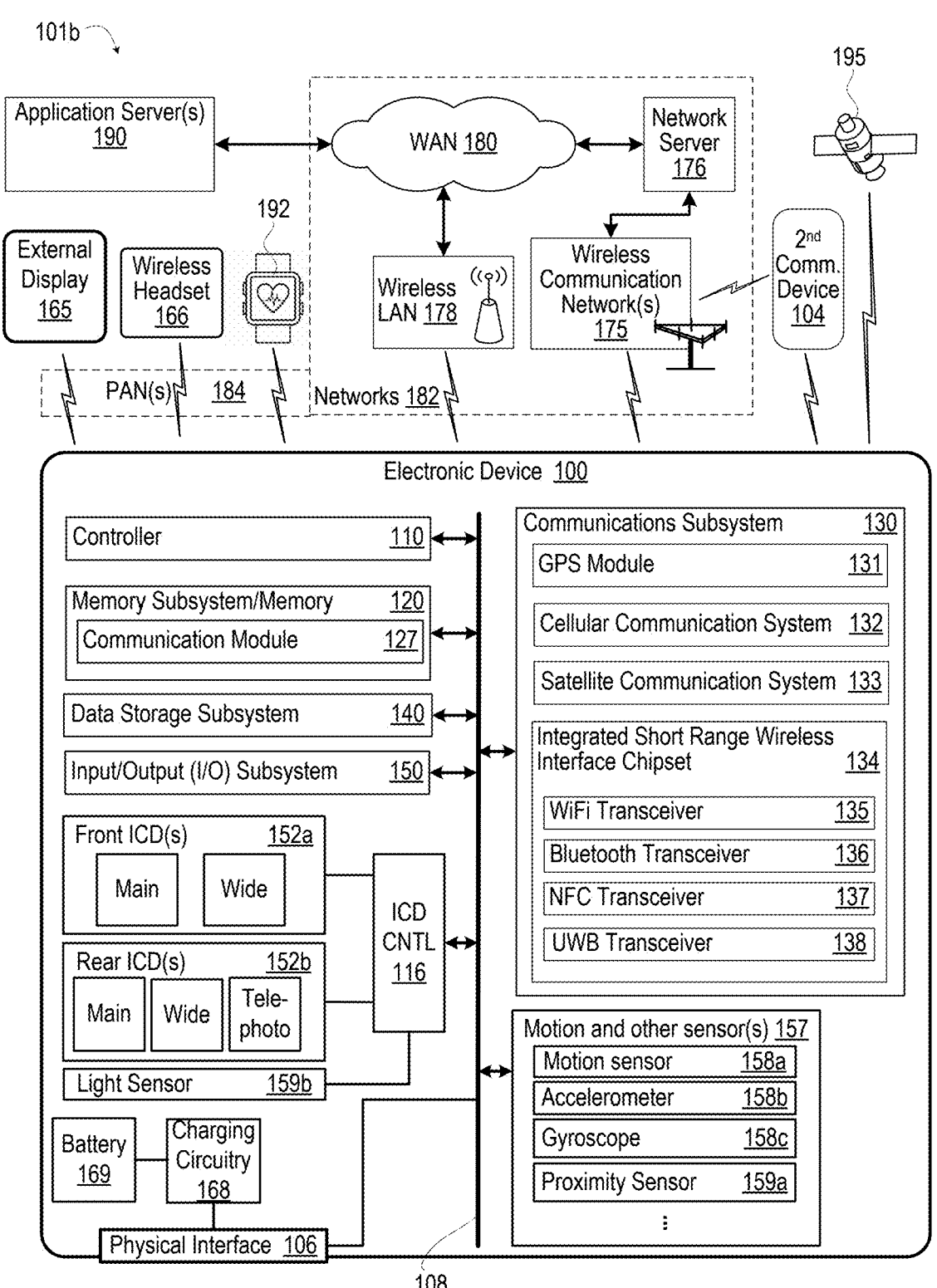
FIG. 1B is an additional block diagram representation of the electronic device of FIG. 1A presenting additional components, including components for wireless communications with other devices, according to one or more embodiments.

With reference to FIG. 1B, as illustrated, motion and other sensor(s) 157 of electronic device 100 include, but are not limited to, one or more motion sensor(s) 158a, one or more accelerometers 158b, one or more gyroscopes 158c, and proximity sensor 159a, etc. Motion sensor(s) 158a detect movement of electronic device 100 and provide motion data to processor 112 indicating the spatial orientation, position and movement of electronic device 100. Accelerometers 158b measure linear acceleration of movement of electronic device 100 in multiple axes (X, Y and Z). For example, accelerometers 158b can include three accelerometers, where one accelerometer measures linear acceleration in the X axis, one accelerometer measures linear acceleration in the Y axis, and one accelerometer measures linear acceleration in the Z axis. Accelerometers 158b can be used to calculate the orientation/position of electronic device 100 relative to the earth and can also be referred to as a gravity sensor. Gyroscope 158c measures rotation or angular rotational velocity of electronic device 100. Proximity sensor 159a senses the presence of nearby objects. In one embodiment, proximity sensor 159a can be an infrared (IR) sensor that detects the presence of a nearby object, such as when electronic device 100 is in a pocket of a user. Electronic device 100 can also include one or more light sensors 159b, which detects the luminance and/or intensity (i.e., the amount) of ambient light surrounding the electronic device 100.

Referring again to FIG. 1A, I/O subsystem 150 includes output devices 160 such as, but not limited to, display(s) 161, lights 162, audio output devices 163, and vibratory and/or haptic output devices 164. In one or more embodiments, electronic device 100 includes an integrated display 161 which incorporates a tactile, touch screen interface that can receive a user's tactile/touch input. As a touch screen device, integrated display 161 allows a user to provide input to and/or to control electronic device 100 by touching features within a user interface presented on integrated display 161. Tactile, touch input device 154 can include a touch screen interface. The touch screen interface can include one or more virtual buttons or selectable affordances. In one or more embodiments, when a user 102 applies a finger or stylus on the touch screen interface (154) in the region demarked by the virtual button, the touch of the region causes the processor 112 to execute code to implement a function associated with the virtual button. In some implementations, integrated display 161 is integrated into a front surface of electronic device housing 105 along with front image capturing devices (not specifically shown), while the higher quality ICDs are located on a rear surface of device housing 105. Other embodiments provide multiple integrated displays within electronic device 100 and references to display(s) 161 are assumed to refer to one or all of these multiple integrated displays.

Vibration/haptic output device 164 can cause electronic device 100 to vibrate or shake when activated. Vibration/haptic output device 164 can be activated during an incoming call or message in order to provide an alert or notification to a user of electronic device 100. In one or more embodiments, integrated display 161, audio output devices (or speakers) 163, and vibration/haptic device 164 can generally and collectively be referred to as output devices.

With reference again to FIG. 1B and with continuing reference to FIG. 1A, there is presented another view of electronic device 100 with components enabling electronic device 100 to function as a mobile communication device, within an expanded communication environment 101b. In addition to the functional and operational components already presented by and described within the description of FIG. 1A, FIG. 1B further illustrates expanded communications subsystem 130 with additional communication components and interfaces enabling electronic device 100 to perform wireless communications within an expanded communication environment 101b that includes other devices.

Communications subsystem 130 includes global positioning system (GPS) module 131 that enables electronic device 100 to communicate with and receive GPS location data from GPS satellite(s) 195. In one or more embodiments, GPS module 131 receives geospatial input from GPS broadcasts of time data and location data from GPS satellite(s) 195 to obtain geospatial location information about the physical location of electronic device 100.

In one or more embodiments, controller 110, via communications subsystem 130, performs multiple types of cellular over-the-air (OTA) or non-cellular wireless communication, such as by using a Bluetooth connection or other personal access network (PAN) connection. As shown, communications subsystem 130 includes cellular communication system 132, which includes at least one radio frequency RF front end coupled to one or more antennas. In one or more embodiments, cellular communication system 132 can include a communication module with one or more baseband processors or digital signal processors, one or more modems, and a radio frequency (RF) front end having one or more transmitters and one or more receivers. In one or more embodiments, controller 110, via communications subsystem 130, may communicate via an OTA cellular connection with radio access networks (RANs) over a cellular wireless communication network (CWCN) 175. CWCN 175 can be a terrestrial network and include a plurality of base stations and associated network server(s) 176, in one embodiment. Cellular communication system 132 allows electronic device 100 to communicate wirelessly with CWCN 175 via transmissions of communication signals (represented as lightning bolts) to and from network communication devices, such as base stations or cellular nodes, of CWCN 175. Alternatively, or in addition, CWCN 175 can include a satellite network, and electronic device 100 connects to CWCN 175 using satellite communication system 133. Cellular communication system 132 and satellite communication system 133 enable electronic device 100 to engage in long distance wireless communication capabilities.

In one or more embodiments, communications subsystem 130 includes integrated short range wireless interface chipset 134 having one or more of Wi-Fi transceiver (TxRX) 135, Bluetooth (BT) TxRx 136, near field communication (NFC) transceiver 137, and ultra-wideband (UWB) transceiver 138. In one or more embodiments, the short-range communication devices are not integrated on a single chipset but can be separately provided hardware components. In one or more embodiments, electronic device 100 can communicate wirelessly with external wireless devices, such as a Wi-Fi router of a wireless local area network (WLAN) 178 and/or second electronic device 104, via one or more short-range wireless interface(s). Second electronic device 104 can be a communication device, such as a smartphone, and/or can be similarly configured as electronic device 100. Second user 171 may operate second electronic device 104. In one or more embodiments, electronic device 100 can receive Internet or Wi-Fi based calls, text messages, multimedia messages, and other notifications via a combination of wireless and wired networks (generally networks 182).

In one or more embodiments, networks 182 can include CWCN 175, WLAN 178, and Wide Area Network (WAN) 180, such as the Internet. In one or more embodiments, WAN 180 can enable electronic device 100 to access application servers 190, which can provide a downloadable version of DDAI module 125 and/or access to other applications, online transactions, and resources. In one or more embodiments, networks 182 can also include personal area networks (PAN) 184, which are individually created with second devices via one of short-range wireless devices from among Wi-Fi TxRX 135, BT TxRx 136, NFC transceiver 137, and UWB transceiver 138. Example second devices include external display 165, wireless headset 166, and wearable computing device 192. External display 165 can be a stand-alone monitor/display or a display integrated into a second electronic device, such as a laptop computer. In at least one embodiment, connection to the external display 165 can be wired and can include an intermediate connection device, such as a docking station device. In one or more embodiments, wearable computing device 192, such as a smartwatch, fitness tracker, or the like, may be paired with electronic device 100, and provide biometric data such as heart rate, breathing rate, and the like, to the electronic device 100 via the paired communication link.

Electronic device 100 also includes a physical interface 106. Physical interface 106 of electronic device 100 can serve as an input/output data port and can be used as a power supply port that is coupled to charging circuitry 168 which feeds electrical power to device battery 169 to enable recharging of device battery 169 and/or powering of electronic device 100. As a data port, physical interface 106 can enable electronic device 100 to be physically coupled via a cable or docking station port to a second device, such as external display 165.

FIG. 1B also presents additional details of ICD(s) 152 of electronic device 100. Throughout the disclosure, the term image capturing device (ICD) is synonymous with and/or utilized interchangeably with any one of the cameras of electronic device 100. ICD(s) (or cameras) 152 includes front cameras 152a and rear cameras 152b. In one embodiment, each of front cameras 152a and rear cameras 152b are communicatively coupled to ICD controller 116. ICD controller 116 supports the processing of image data from front cameras 152a and rear cameras 152b. Front cameras 152a can include a main camera and a wide-angle camera. Rear cameras 152b can include a main camera, a wide-angle camera, and a telephoto camera. Both sets of cameras 152 include image sensors that can capture images that are within the field of view (FOV) of each respective camera 152. In one or more embodiments, one or more of the cameras can be utilized to enable biometric authentication using facial image and/or iris scan recognition.

Figure 2A:
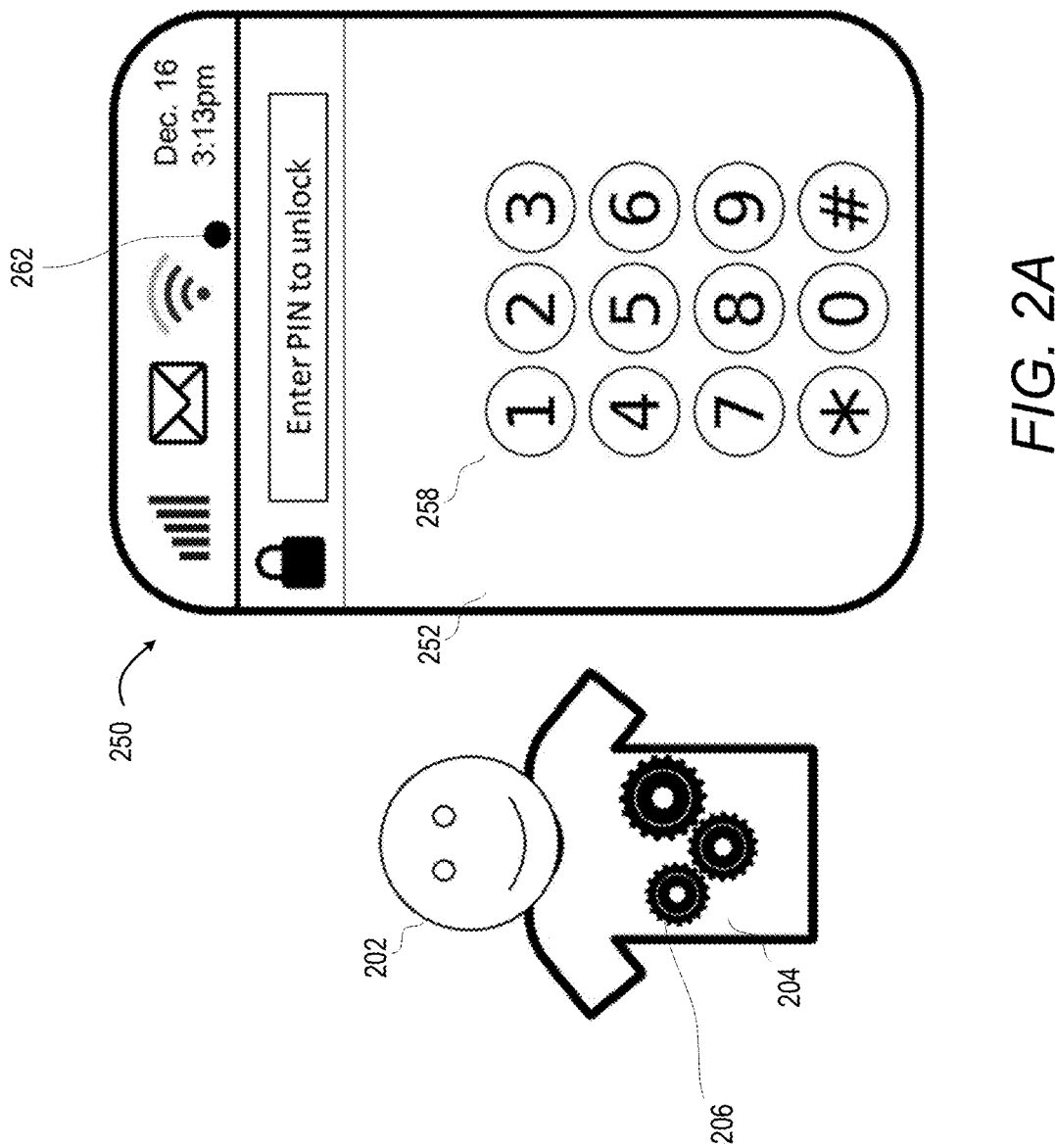
FIGS. 2A and 2B illustrate two examples of different persons attempting to access an electronic device while wearing respective apparel having visual characteristics that are used as a basis for discreet device access indication, according to one or more embodiments.
Figure 2B:
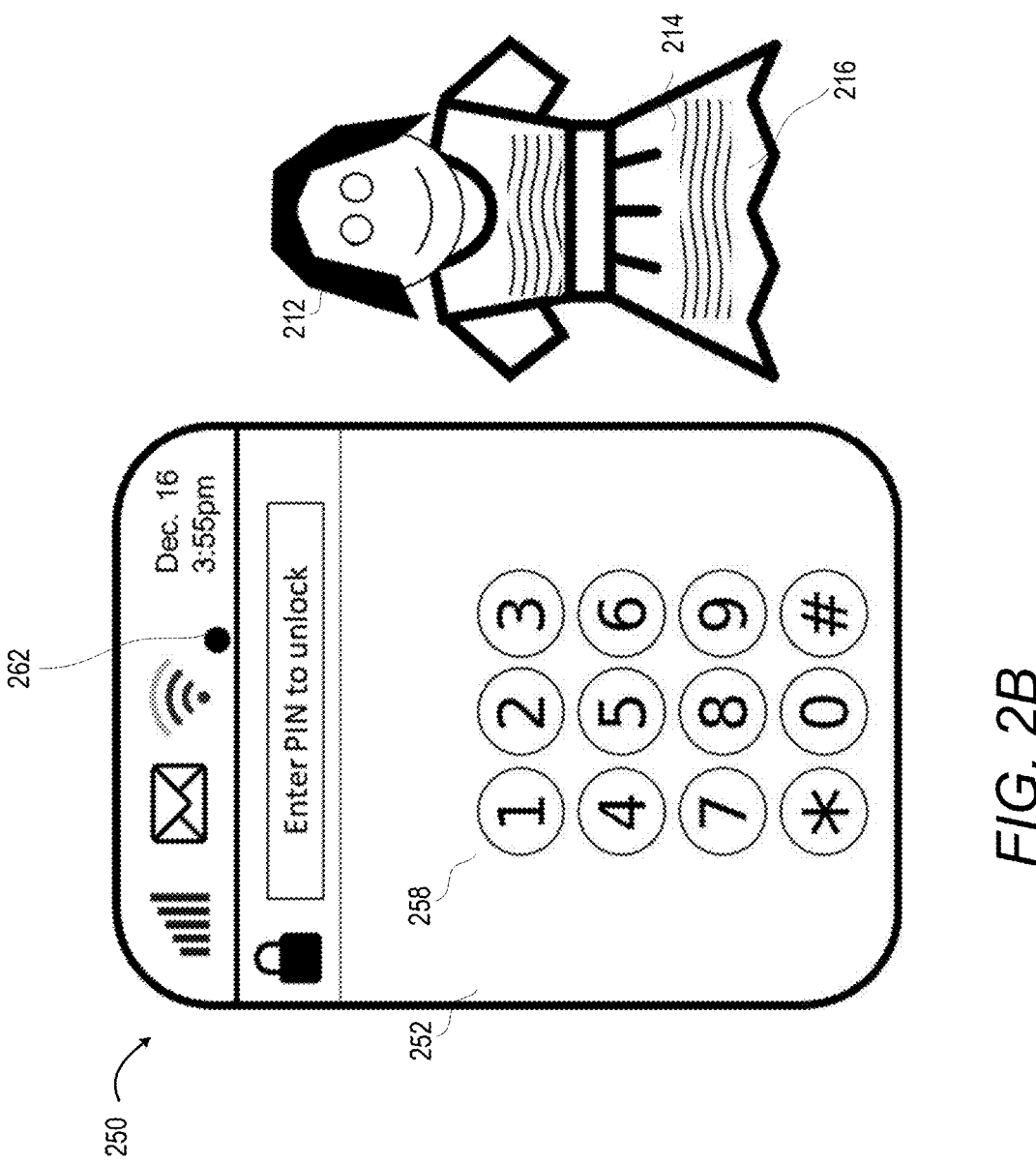

FIG. 2A and FIG. 2B illustrate different persons attempting to access an electronic device at different times, and while wearing respective apparel having visual characteristics that are used as a basis for discreet device access indication, according to one or more embodiments. FIG. 2A shows a first person 202 attempting to access the electronic device 100 at a first time. The first person 202 is wearing apparel that includes shirt 204. Shirt 204 has a pattern/design 206 that includes/resembles gears. FIG. 2B shows a second person 212 accessing the electronic device 100 at a later time. The second person 212 is wearing dress 214. Dress 214 has a pattern/design 216 that includes/resembles wavy stripes. The different characteristics of the apparel shown in FIG. 2 are exemplary, and disclosed embodiments can operate on a wide variety of different types and styles of apparel.

First person 202 and second person 212 interface with electronic device 250. Device 250 may be similar to electronic device 100 depicted in FIG. 1A and FIG. 1B. Device 250 includes display 252 on which virtual keypad 258 is rendered and presented. In one or more embodiments, keypad 258 may be used for entering a PIN or passcode to unlock device 250. Rear camera 262 is embedded in the same surface as display 252 and can be in an always-on mode or can be triggered to turn on in response to detected movement of device or opening of the unlock screen, in alternate embodiments. Rear camera 262 is used to acquire one or more images of a person (such as person 202 or person 212) when a device unlock attempt is detected, such as when keypresses of keypad 258 are detected while the device 250 is in a locked state. In one or more embodiments, images of a person, including apparel worn by the person, are captured by rear camera 262 while the person is pressing one or more buttons of virtual keypad 258 or otherwise interacting with the electronic device 100. According to one aspect of the disclosure, characteristics of the one or more captured images of the person can be used to create modified background screens on the electronic device, where the modified background screens have Gen-AI created patterns that resemble the apparel of the person that attempted the access of the device. According to another aspect of the disclosure, the captured image(s) is utilized to identify the person from among a database (or contact list) of known persons and contextual information associated with the person is retrieved and can be used to create modified background screens on the electronic device, where the modified background screens have Gen-AI created patterns that are associated with the contextual information about the person.

One or more embodiments include systems that utilize image processing techniques and/or AI to analyze images or videos and identify various characteristics of apparel, including the type of clothing, colors, and patterns. One or more embodiments may include AI models that us algorithms such as YOLO (You Only Look Once) or Faster R-CNN to detect and segment the region of interest (e.g., shirts, pants, jackets) in an image. One or more embodiments may utilize neural networks such as Convolutional Neural Networks (CNNs) to extract features such as shape, texture, and edges to classify the type of apparel. In one or more embodiments, pretrained models including ResNet and/or MobileNet are fine-tuned for apparel identification tasks. After segmenting the apparel, embodiments can further include analyzing pixel data to determine the dominant colors and shades. The color determination can include mapping RGB or HSV values to predefined color categories. For pattern processing, one or more embodiments can utilize AI models to identify repetitive or unique elements such as stripes, polka dots, floral prints, or plaid using texture analysis and advanced pattern recognition algorithms. One or more embodiments can utilize deep learning models that are trained on diverse datasets to aid in classifying patterns effectively.

Figure 3A:
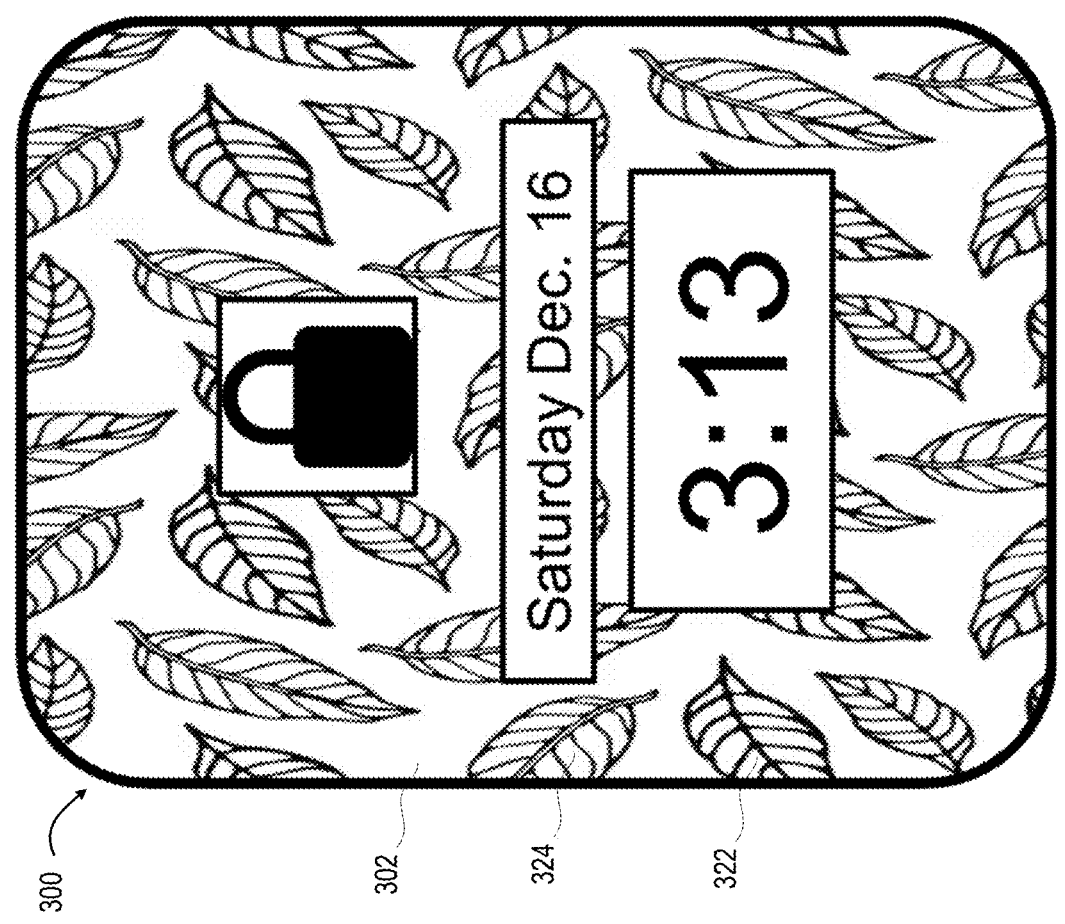
FIG. 3A illustrates an electronic device with an exemplary default background screen, according to one or more embodiments.

FIG. 3A illustrates an electronic device with an exemplary default background screen, according to one or more embodiments. Device 300 may be similar to electronic device 100 depicted in FIG. 1A and FIG. 1B. Device 300 includes display 302 on which background pattern 322 is rendered and presented. The background pattern 322 includes a plant-themed pattern that includes leaves, indicated generally as 324. In the example shown in FIG. 3A, the background pattern 322 is a default background pattern.

Figure 3B:
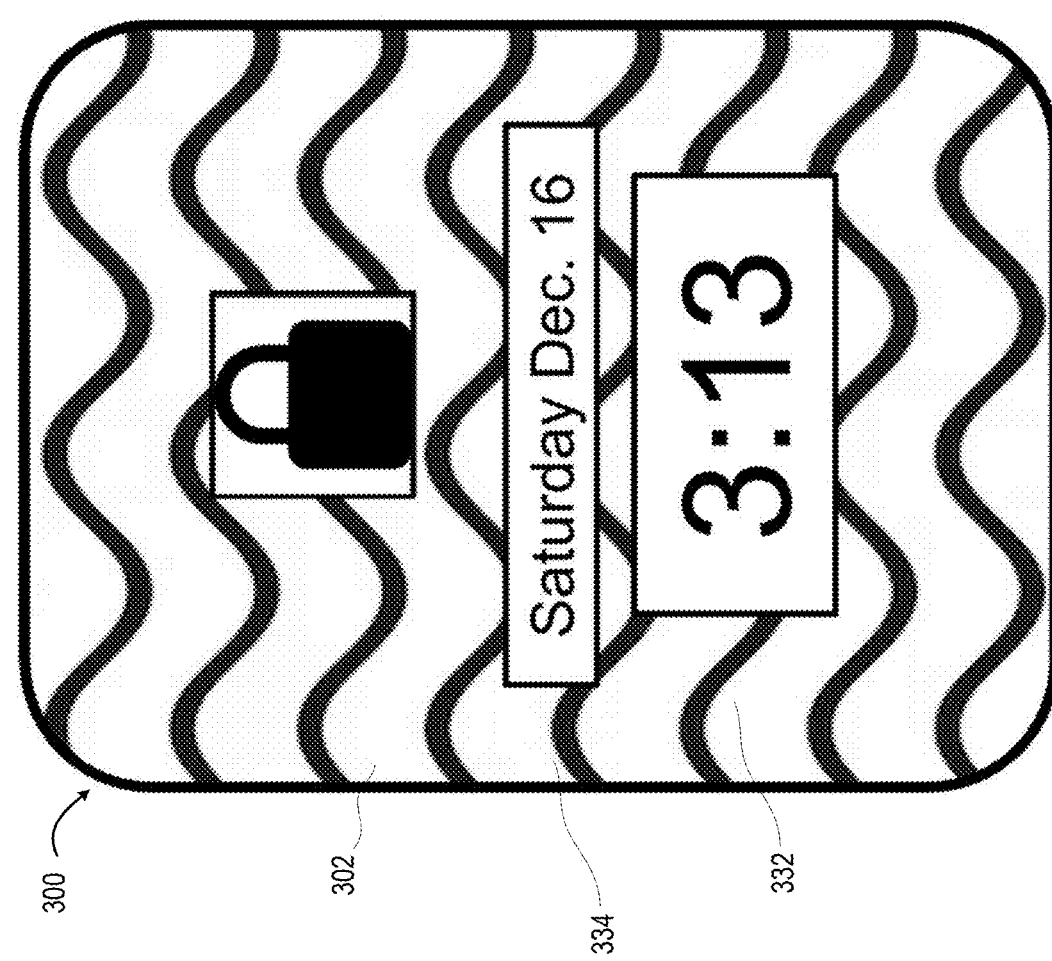
FIG. 3B illustrates the electronic device with an exemplary modified background screen presented based on detected apparel worn by a person attempting to access the electronic device, according to one or more embodiments.

FIG. 3B illustrates the electronic device with an exemplary modified background screen presented based on detected apparel worn by a person attempting to access the electronic device, according to one or more embodiments. In FIG. 3B, device 300 is rendering and presenting, on display 302, a background pattern 332. Pattern 332 includes wavy stripes, indicated generally as 334. Device display 302 is modified to show a background that displays pattern 332, which is indicative of attempted access of electronic device 300, by person 212 of FIG. 2B. The pattern/design 216 of the apparel worn by person 212 is retrieved from a captured image of the person 212 and used as input to a Gen-AI process, which results in the creation, rendering, and presenting of pattern 332 as a background screen (wallpaper) on display of electronic device 300. Accordingly, the background changes from the default background with leaves shown in FIG. 3A to the modified/new background showing wavy stripes in FIG. 3B. In this way, an authorized user of the electronic device 300 is provided with visual clues to surmise who attempted the access to the electronic device, which in this example, is person 212. One or more embodiments can include: identifying a predominant pattern within apparel worn by the person; and generating the customized display theme image using a predominant pattern that includes a similar pattern to the predominant pattern of the apparel.

Figure 3C:
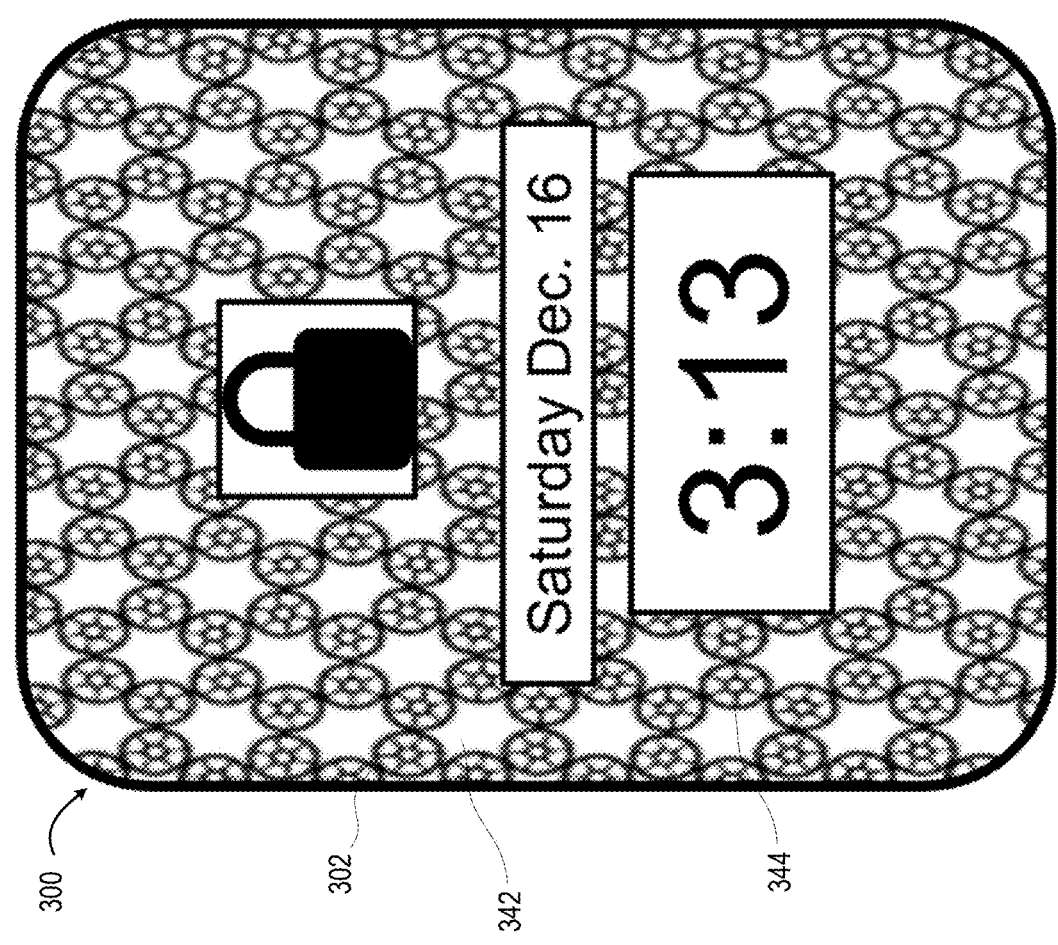
FIG. 3C illustrates the electronic device with another exemplary modified background screen presented based on detected apparel worn by another person interacting with the electronic device, according to one or more embodiments.

FIG. 3C illustrates electronic device with another exemplary modified background screen presented based on detected apparel worn by another person interacting with the electronic device, according to one or more embodiments. In FIG. 3C, device 300 is rendering and presenting a background pattern 342 on display 302. Pattern 342 includes a gear-based design, with gears indicated generally as 344. In exemplary usage, in a case where person 202 in FIG. 2A attempted access of electronic device 300, the pattern/design 206 is captured as an image by a camera on the device, and the captured image is used as input to a Gen-AI process, resulting in the creation, rendering, and presenting of pattern 342 as a background (wallpaper) on display 302 of electronic device 300. In this way, with the background changing from the default background with leaves shown in FIG. 3A, to the background showing gears in FIG. 3C, an authorized user of the electronic device 300 is provided with visual clues enabling the user to surmise who accessed or has attempted to access the electronic device, which in this example, is person 202.

Figure 3D:
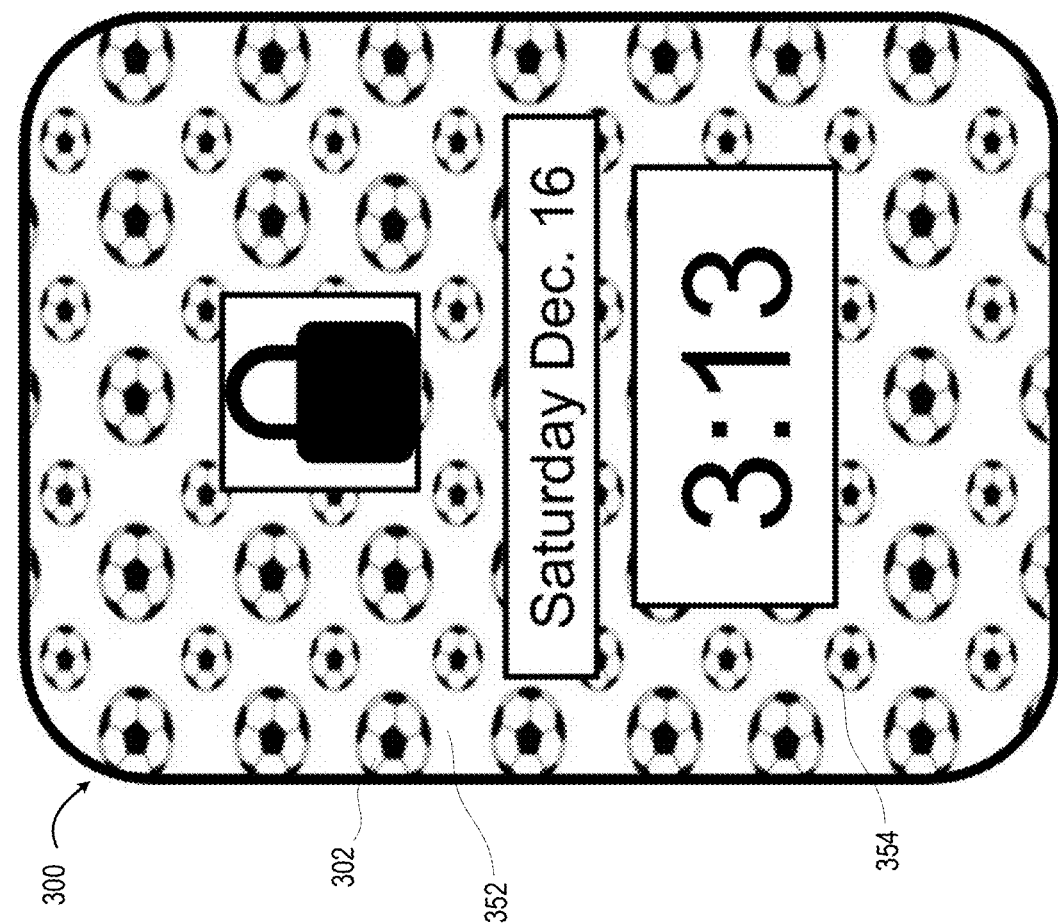
FIG. 3D illustrates electronic device with another exemplary background screen for, modified based on contextual data associated with an identified person who interacted with the electronic device, according to one or more embodiments.

FIG. 3D illustrates electronic device with another exemplary background screen, modified based on contextual data associated with an identified person who interacted with the electronic device, according to one or more embodiments. In FIG. 3D, device 300 renders and presents, on display 302, pattern 352 that includes soccer balls, indicated generally as 354. One or more embodiments can include identifying a person using facial recognition techniques, identifying contextual data pertaining to the identified person, generating a pattern based on the contextual data, and rendering and presenting the generated pattern on a display of the electronic device. As an example, if the person 202 in FIG. 2A attempted access of electronic device 300, and person 202 has a profile record stored on device 300 or otherwise accessible to device 300 that indicates soccer as an interest, a soccer-based pattern such as shown at 352 can be rendered and presented on display 302. One or more pieces of metadata (contextual data) can be used as input to a Gen-AI process, resulting in the creation, rendering, and presenting of pattern 352 as a background (wallpaper) on electronic device 300. In the example of FIG. 3D, person 202 has a profile that includes metadata that indicates an interest in soccer. Based on the soccer interest, the word 'soccer' can be input to a Gen-AI process. Alternatively, an image of a soccer ball, and/or other soccer related images (e.g., team logo) can be input to a Gen-AI process. The Gen-AI process then can output background screen with soccer-themed pattern 352. In one or more embodiments, the contextual data includes a list of interests for the identified person. In this way, with the background of the display changing from the default background screen with leaves shown in FIG. 3A, to the background screen showing soccer balls in FIG. 3D, an authorized user of the electronic device 300 is provided with clues to surmise that the person who attempted the access, which in this example, is person 202, has some known association with soccer. One or more embodiments can include: performing facial recognition on a face within the image to identify the person; obtaining contextual data for the identified person; and generating the customized display theme using the obtained contextual data for the identified person. In embodiments, obtaining contextual data comprises obtaining contextual data from a second electronic device. The second electronic device can include another electronic device on a local-area network, a wearable computer, another electronic device on a wide-area network, a cloud computing device, a virtual machine, and/or other suitable electronic device.

Figure 4:
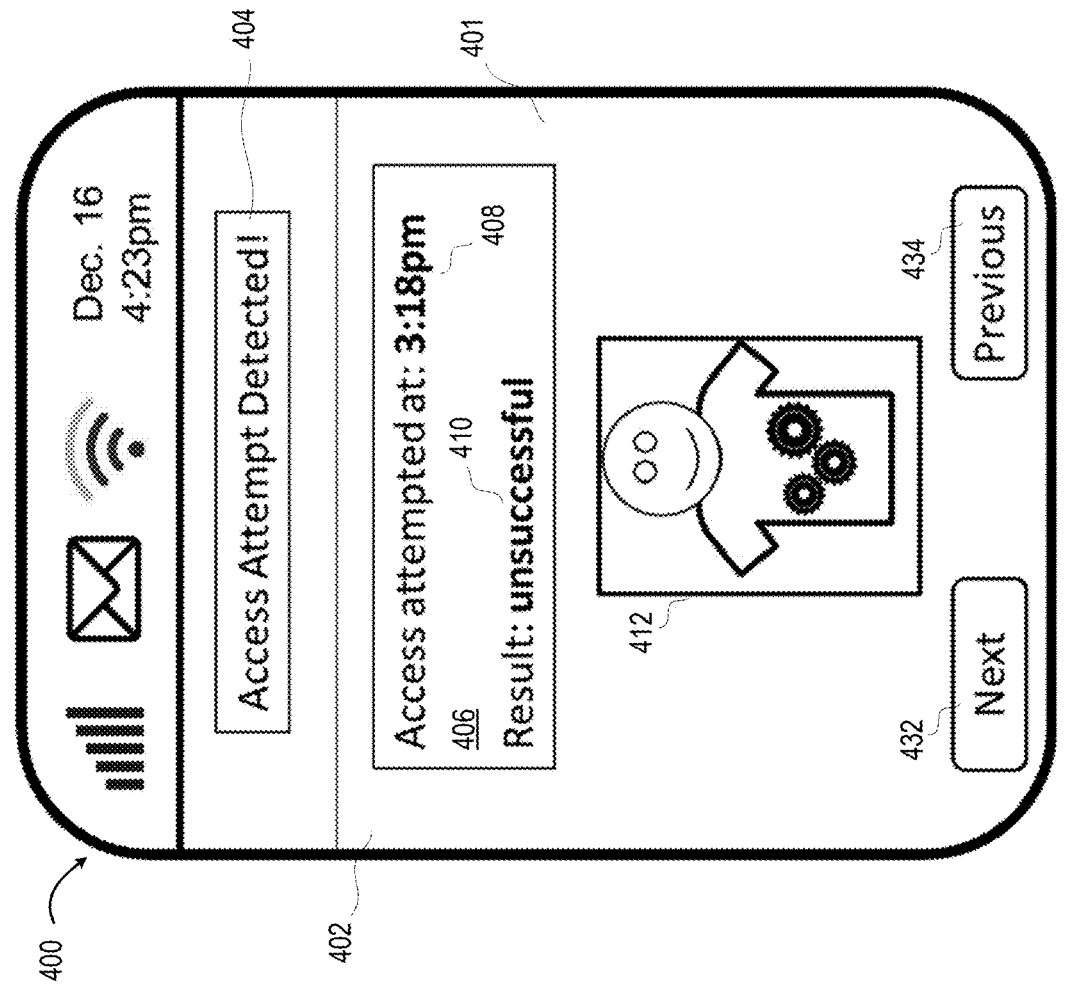
FIG. 4 illustrates an exemplary user interface of electronic device indicating an attempted device access, according to one or more embodiments.

FIG. 4 illustrates an exemplary user interface indicating an attempted device access, according to one or more embodiments. Device 400 may be similar to electronic device 100 depicted in FIG. 1A and FIG. 1B. Device 400 includes display 402 on which user interface 401 is rendered and presented. User interface 401 presents an indication 404 of an access attempt. A details field 406 can include details of the access attempt, including, but not limited to, a time of the attempted access, indicated at 408, and a result of the access attempt, indicated at 410. The user interface 401 may further include image data of the attempted access, indicated at 412. The image data can include one or more images acquired by an onboard image capturing device (e.g., 152*b* of FIG. 1B) during the attempted or successful access to the electronic device. In this way, an authorized user of the electronic device 400 is provided with detailed visual information as to who attempted the access, which in this example, is person 202 of FIG. 2. One or more embodiments can include recording in an access log, an indication of whether the person performed a successful access attempt or an unsuccessful access attempt.

One or more embodiments may store a history of interactions, which can include attempted access (unsuccessful attempt to unlock the electronic device), successful access (successful unlocking of the electronic device), and/or use of the electronic device. Information about each access, such as a time and/or date of access, result (successful or unsuccessful), and/or an image of the person that interacted with the device, can be stored and presented in a manner so that a history of interactions can be viewed. In some embodiments, user interface 401 includes option 432 which when invoked, causes the processor of device 400 to render and present a next interaction record, and option 434, which when invoked, causes the processor of device 400 to render and present a previous interaction record.

Figure 6:
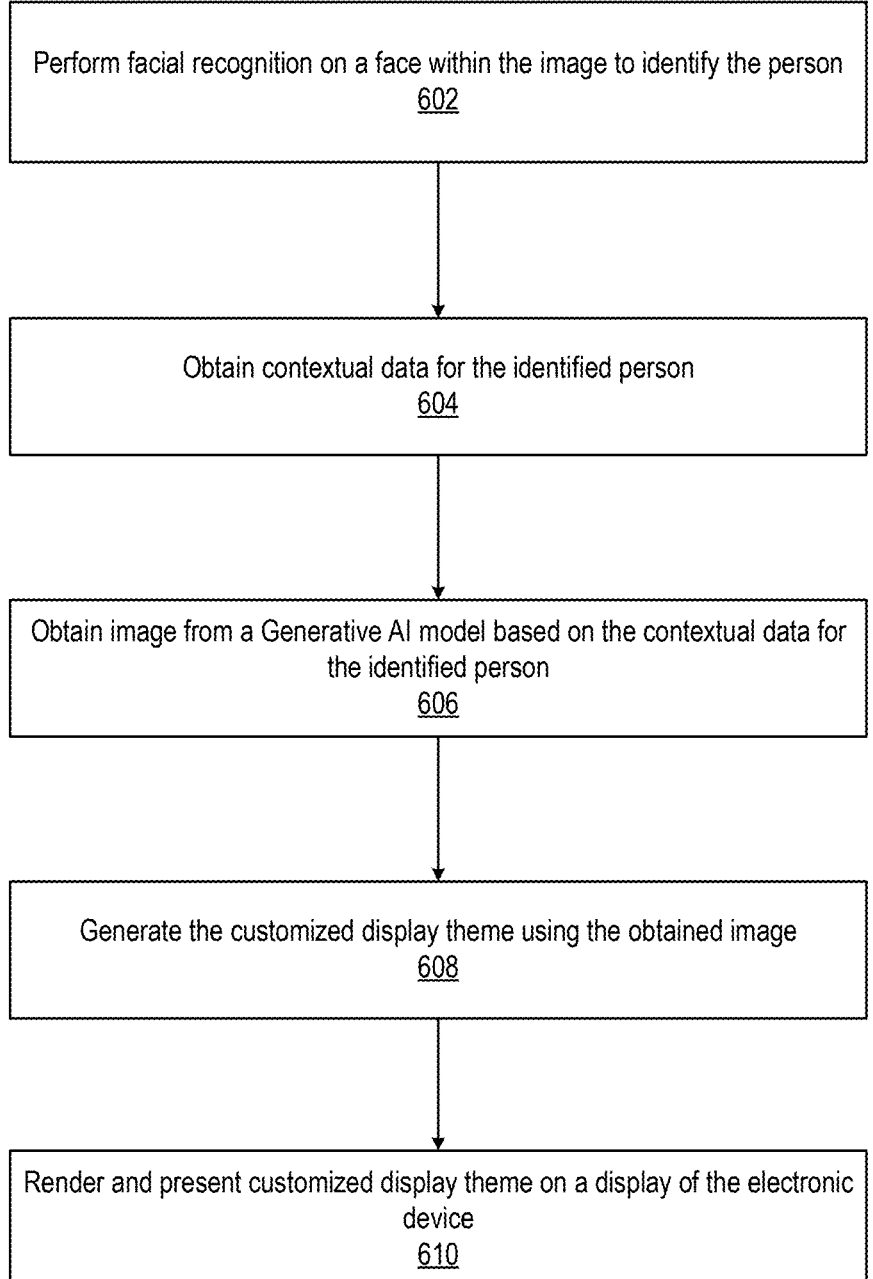
FIG. 6 depicts a flowchart of a computer-implemented method for additional embodiments for discreet device access indication using contextual data, according to one or more embodiments.

Referring now to the flowcharts presented by FIG. 5-FIG. 6, the descriptions of the methods in FIG. 5-FIG. 6 are provided with general reference to the specific components and features illustrated within the preceding FIGS. 1-4. Specific components referenced in the methods of FIG. 5-FIG. 6 may be identical or similar to components of the same name used in describing preceding FIGS. 1-4. In one or more embodiments, processor 112 (FIG. 1A) configures electronic device 100 (FIG. 1) to provide the described functionality of the methods of FIG. 5-FIG. 6 by executing program code for one or more modules or applications provided within system memory 120 of electronic device 100, including discreet device access indication (DDAI) module 125.

FIG. 5 depicts a flowchart of a computer-implemented method for discreet device access indication using generative AI, according to one or more embodiments. The method 500 starts at block 502, where an attempt to access the electronic device is detected by at least one processor of the electronic device, which includes an electronic display and at least one image capturing device. The detection can include detecting an attempt to enter a password and/or passcode on a touchscreen of the electronic device. In one or more embodiments the detection can be a simple action of picking up and looking at or moving the electronic device. The method 500 continues to block 504, where an image of a person attempting the access (or otherwise interacting with the electronic device) is captured via at least one image capturing device. In one or more embodiments, images from rear-facing image capture device(s) are acquired as touchscreen input is applied in an attempt to unlock the electronic device.

The method 500 continues to block 506, where a customized display theme based on the image is generated. One or more embodiments can utilize Gen-AI to create a pattern based on an input image, such as with the gears shown in FIG. 2 and FIG. 3C, by analyzing the input image, identifying key features, and generating new designs based on those features. One or more embodiments may perform feature extraction on an input image (e.g., an image of 202 of FIG. 2). In one or more embodiments, an AI model identifies and extracts key characteristics of the input pattern, such as shapes, edges, textures, colors, and repetitive elements. In the example of gears, the AI model can be trained to recognize circular forms, teeth patterns, symmetry, and metallic textures. In some embodiments, the term 'latent space' can refer to a lower-dimensional representation of data where the key features or patterns of the data are captured in a compressed and abstract form. In one or more embodiments, the input image is transformed into a mathematical representation using embeddings in latent space (e.g., through a trained neural network such as a Variational Autoencoder or GAN (Generative Adversarial Network)), as part of a process to generate an output image based on the input image.

In one or more embodiments, the pattern generation process can include latent space manipulation. In one or more embodiments, AI models including GANs and/or diffusion models can use the latent representation of the input to modify or expand upon the extracted features. In the example using gears (206 of FIG. 2), the pattern generation can include generating new arrangements of the gears, and/or introducing creative variations while maintaining the "gear" theme, such as overlapping shapes, altered colors, or abstract interpretations. One or more embodiments may utilize repetitions and/or tiling to generate a visually appealing pattern that can repeat seamlessly for use as a wallpaper or background. Moreover, parameters such as size, color schemes, and density can be adjusted based on user preferences or application constraints. One or more embodiments can include: identifying a predominant color within apparel worn by the person within the captured image; and generating the customized display theme using a predominant color that includes a similar color to the predominant color of the apparel. The method 500 continues to block 508, where the customized display theme is rendered and presented on the electronic display. One or more embodiments can include: providing the image to a generative artificial intelligence (Gen-AI) model; obtaining a generated image from the Gen-AI model based on the provided image; and including the generated image in the customized display theme that is rendered and presented on the electronic display. In one or more embodiments, the customized display theme is stored in an image format such as JPEG, PNG, WebP, or other suitable image format. One or more embodiments can include rendering an image of the Gen-AI generated pattern on a display of the electronic device, such as with the examples depicted in FIG. 3B, FIG. 3C, and FIG. 3D.

FIG. 6 depicts a flowchart of a computer-implemented method for discreet device access indication using contextual data, according to one or more embodiments. The method 600 starts at block 602, where facial recognition is performed on a face within a captured image to identify the person. One or more embodiments can utilize facial recognition using AI and/or computer vision techniques to analyze facial features to determine a person's identity. A preliminary step can include locating and isolating a face within an image or video frame. In one or more embodiments, the locating and isolating can utilize Haar Cascades and/or HOG (Histogram of Oriented Gradients). In one or more embodiments, the locating and isolating can include models including MTCNN (Multi-task Cascaded Convolutional Networks) and/or YOLO (You Only Look Once). The output of the locating and isolating step can include a bounding box around the face. The detected face can then be aligned to standardize its orientation and scale, enabling consistent feature extraction. The alignment can include performing keypoint detection to identify landmarks such as eyes, nose, and mouth. Feature extraction can then be performed using techniques such as PCA (Principal Component Analysis) and/or deep learning models such as FaceNet, ArcFace, or VGGFace to extract features. The extracted features can then be compared with stored data to determine identity.

The method 600 continues to block 604 where contextual data is obtained for the identified person. In one or more embodiments, the contextual data can be obtained from a contact database on an electronic device, a public profile on a social media site, and/or other suitable data source. The contextual data can include metadata such as a name, gender, relationship to the authorized user of the electronic device (e.g., family, friend, etc.), and/or other metadata. The metadata can include schools and/or universities attended, hobbies, activities, favorite movies, music, and/or books, and so on. In general, one or more of these pieces of metadata can be used as a prompt for generating of a customized display theme.

The method 600 continues to block 606 where an image is obtained from a generative AI model based on the contextual data for the identified person. In one or more embodiments, the Gen-AI models can generate images from text prompts using a combination of natural language processing (NLP) and computer vision techniques. In embodiments, the contextual data is provided as a text prompt to a Gen-AI model. The text prompt can then be tokenized and transformed into numerical vectors. In one or more embodiments, a language model, such as a transformer (e.g., GPT or T5), interprets the prompt, capturing the semantic meaning and context and creating a high-dimensional text embedding that represents the prompt. One or more embodiments may utilize models such as CLIP (Contrastive Language-Image Pretraining) to map both text and images into a shared latent space where similar concepts are positioned closely. The text embedding can then be translated into an image-compatible latent representation, providing a conceptual "blueprint" of the desired output. One or more embodiments may utilize a diffusion model and/or GAN (Generative Adversarial Network) as part of the process of creating the customized display theme. The method 600 continues to block 608 where the customized display theme is generated using the image that was obtained from the Gen-AI model. The customized display theme can include a background or wallpaper that is based on a repeated pattern (tiling) of the image that was obtained from the Gen-AI model. One or more embodiments may further enable customization of lock screens, icons, menus, fonts, and/or other design elements using output from the Gen-AI model. The method 600 continues to block 610, where the customized display theme is rendered and presented on a display of the electronic device.

The flowcharts, sequences, and configurations presented herein are provided solely for illustrative purposes and are exemplary in nature. These embodiments are not intended to be limiting and may include variations with more, fewer, and/or alternative options, sequences, or features as would be apparent to those skilled in the art.

As can now be appreciated, disclosed embodiments provide a feature that can change a smartphone or tablet computer screen's background (wallpaper) to subtly reflect the apparel of someone who attempted to unlock or accessed the device, offering several advantages in terms of security, personalization, and user awareness. By changing the background to reflect elements of the person's apparel or other characteristics of the person, the device provides a non-intrusive but noticeable cue to the owner about an unauthorized/completed access attempt. The features provided by disclosed embodiments avoid the need for direct alerts, which might not always be discreet. Additionally, the resemblance of the background screen to the intruder's apparel (or known characteristics) serves as a reminder for the owner to take further actions, such as reviewing detailed information about the access attempt (e.g., as shown in FIG. 4), and/or increasing security measures. As an alternative to explicit messages or alarms, the approach of disclosed embodiments provides a passive way to communicate security events. Furthermore, subtle visual clues are intuitive and can be quickly noticed without technical expertise. Another potential benefit is that would-be intruders may realize their attempts are being monitored if they notice unique patterns or backgrounds appearing after failed unlock attempts, thereby serving as a deterrent against further unauthorized attempts. Thus, disclosed embodiments effectively combine creativity, personalization, and subtle security, making electronic devices both more secure and user-friendly.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined primarily by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
an electronic display;
at least one image capturing device (ICD) that captures image content;
at least one input device that can be utilized for accessing the electronic device;
a memory having stored thereon a discreet device access indication (DDAI) module; and
at least one processor communicatively coupled to the electronic display, the at least one ICD, the at least one input device, and the memory, the at least one processor executing program code of the DDAI module, and is configured to cause the electronic device to:
in response to detecting an attempt to access the electronic device:
capture, via the at least one image capturing device, an image of a person attempting the access;
identify the person;
obtain contextual data for the identified person;
obtain a list of interests for the person from the obtained contextual data;
generate a customized display theme based on the image and change a background of the display from a default background to a new background that provides visual clues to enable an authorized user of the electronic device to surmise an interest or association of the person who attempted the access; and render and present the customized display theme with the new background on the electronic display.

2. The electronic device of claim 1, wherein further, the at least one processor is configured to cause the electronic device to:
identify a predominant color within apparel worn by the person within the captured image; and
generate the customized display theme using a predominant color that includes a similar color to the predominant color of the apparel.

3. The electronic device of claim 1, wherein further, the at least one processor is configured to cause the electronic device to:
identify a predominant pattern within apparel worn by the person; and
generate the customized display theme image using a predominant pattern that includes a similar pattern to the predominant pattern of the apparel.

4. The electronic device of claim 1, wherein further, the at least one processor is configured to cause the electronic device to:
perform facial recognition on a face within the image to identify the person;
and
generate the customized display theme using the obtained contextual data for the identified person.

5. The electronic device of claim 4, further comprising a communications subsystem for communicatively connecting the electronic device with at least one second electronic device, and wherein further, the at least one processor is configured to cause the electronic device to obtain the contextual data from a second electronic device.

6. The electronic device of claim 1, wherein further, the at least one processor is configured to cause the electronic device to:
record, in an access log that is stored in the memory, an indication of whether the person performed a successful access attempt or an unsuccessful access attempt.

7. The electronic device of claim 1, wherein to generate the customized display theme, the at least one processor is configured to cause the electronic device to:
provide the image to a generative artificial intelligence (Gen-AI) model;
obtain a generated image from the Gen-AI model based on the provided image; and
include the generated image in the customized display theme that is rendered and presented on the electronic display.

8. A method comprising:
detecting, by at least one processor of an electronic device that includes an electronic display and at least one image capturing device, an attempt to access the electronic device;
in response to detecting the attempt to access the electronic device:
capturing, via the at least one image capturing device, an image of a person attempting the access;
identifying the person;
obtaining contextual data for the identified person;
obtaining a list of interests for the person from the obtained contextual data;
generating a customized display theme based on the image and changing a background of the display from a default background to a new background that provides visual clues to enable an authorized user of the electronic device to surmise an interest or association of the person who attempted the access; and rendering and presenting the customized display theme with the new background on the electronic display.

9. The method of claim 8, further comprising:

identifying a predominant color within apparel worn by the person within the captured image; and generating the customized display theme using a predominant color that includes a similar color to the predominant color of the apparel.

10. The method of claim 8, further comprising:

identifying a predominant pattern within apparel worn by the person; and generating the customized display theme image using a predominant pattern that includes a similar pattern to the predominant pattern of the apparel.

11. The method of claim 8, further comprising:

performing facial recognition on a face within the image to identify the person; and generating the customized display theme using the obtained contextual data for the identified person.

12. The method of claim 11, wherein obtaining contextual data comprises obtaining contextual data from a second electronic device.

13. The method of claim 8, further comprising recording in an access log, an indication of whether the person performed a successful access attempt or an unsuccessful access attempt.

14. The method of claim 8, further comprising:

providing the image to a generative artificial intelligence (Gen-AI) model;

obtaining a generated image from the Gen-AI model based on the provided image; and including the generated image in the customized display theme that is rendered and presented on the electronic display.

15. A computer program product comprising a non-transitory computer readable medium having program instructions that when executed by a processor of an electronic device comprising an electronic display and at least one image capturing device, configure the electronic device to perform functions comprising:

detecting an attempt to access the electronic device;

in response to detecting the attempt to access the electronic device:

capturing, via the at least one image capturing device, an image of a person attempting the access;

identifying the person;

obtaining contextual data for the identified person;

obtaining a list of interests for the person from the obtained contextual data;

generating a customized display theme based on the image and changing a background of the display from a default background to a new background that provides visual clues to enable an authorized user of the electronic device to surmise an interest or association of the person who attempted the access; and rendering and presenting the customized display theme with the new background on the electronic display.

16. The computer program product of claim 15, further comprising program instructions for:

identifying a predominant color within apparel worn by the person within the captured image; and generating the customized display theme using a predominant color that includes a similar color to the predominant color of the apparel.

17. The computer program product of claim 15, further comprising program instructions for:

identifying a predominant pattern within apparel worn by the person; and generating the customized display theme image using a predominant pattern that includes a similar pattern to the predominant pattern of the apparel.

18. The computer program product of claim 15, further comprising program instructions for:

providing the image to a generative artificial intelligence (Gen-AI) model;

obtaining a generated image from the Gen-AI model based on the provided image; and including the generated image in the customized display theme that is rendered and presented on the electronic display.

* * * * *